United States Patent
Han et al.

(10) Patent No.: US 10,402,993 B2
(45) Date of Patent: *Sep. 3, 2019

(54) STRUCTURED LIGHT GENERATOR AND OBJECT RECOGNITION APPARATUS INCLUDING THE SAME

(71) Applicants: SAMSUNG ELECTRONICS CO., LTD., Suwon-si (KR); CALIFORNIA INSTITUTE OF TECHNOLOGY, Pasadena, CA (US)

(72) Inventors: Seunghoon Han, Seoul (KR); Ali Naqavi, Pasadena, CA (US); Harry Atwater, Pasadena, CA (US)

(73) Assignees: SAMSUNG ELECTRONICS CO., LTD., Suwon-si (KR); CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/040,155

(22) Filed: Jul. 19, 2018

(65) Prior Publication Data

US 2018/0322645 A1 Nov. 8, 2018

Related U.S. Application Data

(63) Continuation of application No. 15/426,646, filed on Feb. 7, 2017.

(30) Foreign Application Priority Data

Aug. 31, 2016 (KR) .................. 10-2016-0112087

(51) Int. Cl.
*G02B 27/10* (2006.01)
*G06T 7/521* (2017.01)
(Continued)

(52) U.S. Cl.
CPC .............. *G06T 7/521* (2017.01); *F21V 5/002* (2013.01); *G01B 11/2513* (2013.01);
(Continued)

(58) Field of Classification Search
CPC ..... F21V 5/002; G01B 11/2513; G02B 1/002; G02B 27/106; G02B 5/1809;
(Continued)

(56) References Cited

U.S. PATENT DOCUMENTS 5,377,287 A * 12/1994 Lee ...................... G02B 6/2848
385/31
5,621,529 A * 4/1997 Gordon .................. G01B 11/00
250/237 G (Continued)

FOREIGN PATENT DOCUMENTS

EP 2204671 A1 7/2010
EP 2 831 538 2/2015
(Continued)

OTHER PUBLICATIONS

Jinwei Zeng et al., "Manipulating Complex Light with Metamaterials", Scientific Reports, Oct. 2, 2013, pp. 1-6, vol. 3, No. 2826, XP055394391, DOI: 10.1038/srep02826.
(Continued)

*Primary Examiner* — Mekonen T Bekele
(74) *Attorney, Agent, or Firm* — Sughrue Mion, PLLC

(57) ABSTRACT

A structured light generator includes a light source configured to emit light, and a first meta optical device including a first metasurface including nanostructures having subwavelength dimensions that are less than a wavelength of the light emitted from the light source, the first metasurface being configured to form a distribution of light rays from the light emitted from the light source to thereby radiate structured light.

20 Claims, 11 Drawing Sheets

Related U.S. Application Data

(60) Provisional application No. 62/315,267, filed on Mar. 30, 2016.

(51) Int. Cl.
| | |
|---|---|
| *G01B 11/25* | (2006.01) |
| *G02B 1/00* | (2006.01) |
| *G02B 5/18* | (2006.01) |
| *G06T 7/246* | (2017.01) |
| *F21V 5/00* | (2018.01) |
| *G06K 9/00* | (2006.01) |
| *G06K 9/62* | (2006.01) |

(52) U.S. Cl.
CPC ........... *G02B 1/002* (2013.01); *G02B 5/1809* (2013.01); *G02B 27/106* (2013.01); *G02B 27/1093* (2013.01); *G06K 9/00201* (2013.01); *G06K 9/6202* (2013.01); *G06T 7/248* (2017.01); *G02B 2207/00* (2013.01); *G06T 2207/10028* (2013.01)

(58) Field of Classification Search
CPC ............ G02B 2207/00; G02B 27/1093; G06K 9/00201; G06K 9/6202; G06T 7/248; G06T 7/521; G06T 2207/10028
See application file for complete search history.

(56) References Cited

U.S. PATENT DOCUMENTS

| | | | | |
|---|---|---|---|---|
| 8,872,155 B2* | 10/2014 | Han | ................... | B82Y 20/00 257/13 |
| 9,876,580 B2* | 1/2018 | Yuan | ................... | H04B 10/70 |
| 2003/0076404 A1* | 4/2003 | Taniguchi | ................. | G03F 1/26 347/255 |
| 2003/0184838 A1* | 10/2003 | Akiyama | .............. | G02F 1/0121 359/239 |
| 2004/0086280 A1* | 5/2004 | Duraffourg | ........... | H04L 9/0852 398/186 |
| 2005/0259999 A1* | 11/2005 | Covey | ................... | G02F 3/00 398/188 |
| 2006/0286488 A1* | 12/2006 | Rogers | ................... | B82B 3/00 430/325 |
| 2008/0255774 A1* | 10/2008 | Liu | ....................... | G01N 29/041 702/34 |
| 2009/0096783 A1 | 4/2009 | Shpunt et al. | | |
| 2010/0091224 A1* | 4/2010 | Cho | ....................... | G02B 5/201 349/105 |
| 2011/0180779 A1* | 7/2011 | Han | ....................... | H01L 33/06 257/13 |
| 2011/0309363 A1* | 12/2011 | Misaki | ................ | G02F 1/13458 257/59 |
| 2012/0319044 A1* | 12/2012 | Zhang | ................. | C07D 239/26 252/299.61 |
| 2013/0120843 A1* | 5/2013 | Junger | .................. | B82Y 20/00 359/589 |
| 2014/0085693 A1 | 3/2014 | Mosallaei et al. | | |
| 2014/0277433 A1 | 9/2014 | Pugh et al. | | |
| 2015/0039218 A1 | 2/2015 | Bowers et al. | | |
| 2015/0129851 A1 | 5/2015 | Lee et al. | | |
| 2015/0229919 A1* | 8/2015 | Weber | .................... | H04N 17/02 348/184 |
| 2016/0259175 A1* | 9/2016 | Ellenbogen | ............ | G02B 1/002 |
| 2017/0023803 A1* | 1/2017 | Han | ........................ | G02F 1/015 |

FOREIGN PATENT DOCUMENTS

| | | |
|---|---|---|
| FR | 3 007 148 A1 | 12/2014 |
| KR | 1020140113553 A | 9/2014 |
| KR | 1020150054075 A | 5/2015 |
| WO | 2013/144952 A1 | 10/2013 |
| WO | 2015/054601 A2 | 4/2015 |

OTHER PUBLICATIONS

Communication issued by the European Patent Office dated Aug. 14, 2017 in counterpart European Patent Application No. 17152279.0.

Anonymous, "Electromagnetic metasurface", Wikipedia, Mar. 12, 2017 (last edited), Total 4 pages, XP055395329, Retrieved from the Internet: https://en.wikipedia.org/wiki/Electromagnetic_metasurface.

* cited by examiner

STRUCTURED LIGHT GENERATOR AND OBJECT RECOGNITION APPARATUS INCLUDING THE SAME

CROSS-REFERENCE TO RELATED APPLICATION

This application is a continuation of U.S. patent application Ser. No. 15/426,646, filed on Feb. 7, 2017, in the U.S. Patent and Trademark Office, which claims priority from U.S. Provisional Patent Application No. 62/315,267, filed on Mar. 30, 2016, in the U.S. Patent and Trademark Office, and Korean Patent Application No. 10-2016-0112087, filed on Aug. 31, 2016, in the Korean Intellectual Property Office, the disclosures of which are incorporated herein by reference in their entireties.

BACKGROUND

1. Field

Methods and apparatuses consistent with exemplary embodiments disclosed herein relate to structured light generators for generating structured lighting and object recognition apparatuses for sensing a shape or a motion of a three-dimensional (3D) object by using the structured light generators.

2. Description of the Related Art

Recently, in order to recognize objects such as people or other things, accurately identifying the shape, location, motion, or the like of an object by using precise three-dimensional (3D) shape recognition has been emphasized. As one method in this regard, 3D sensing technology using structured light (a structured light system) has been developed, and thus, precise motion recognition has become possible.

In comparison with previously used light systems, such a structured light system is required to have a smaller size and higher resolution when combined with various electronic devices. In order to generate structured light, an optical component such as a diffractive optical element (DOE) is commonly used, and the volume of such an optical component is a factor that influences the precision degree of design and manufacturing requirements.

SUMMARY

Exemplary embodiments disclosed herein provide structured light generators for generating structured light.

Exemplary embodiments disclosed herein also provide e three-dimensional (3D) object recognition apparatuses including structured light generators.

Additional aspects will be set forth in part in the description which follows and, in part, will be apparent from the description, or may be learned by practice of the presented exemplary embodiments.

According to an aspect of an exemplary embodiment, there is provided a structured light generator including a light source configured to emit light; and a first meta optical device including a first metasurface including nanostructures having sub-wavelength dimensions that are less than a wavelength of the light emitted from the light source, wherein the first metasurface is configured to form a distribution of light rays from the light emitted from the light source to thereby radiate structured light.

The nanostructures of the first meta optical device may have forms that are configured to realize a predetermined transmission intensity distribution and transmission phase distribution with respect to the emitted light incident thereon.

The light source may include a light exit surface through which the emitted light exits; and the first meta optical device may have a monolithic structure and may be provided directly on the light exit surface of the light source.

The nanostructures of the first meta optical device may have shapes and an arrangement that are determined such that a transmission intensity distribution and transmission phase distribution with respect to the emitted light incident thereon are repeated.

The nanostructures of the first meta optical device may have the shapes and distribution such that two transmission phase modulation values are obtained.

The two transmission phase modulation values may be 0 and Tr.

A distance from the light source to the first metasurface may be determined such that a contrast of a structured light pattern formed by the distribution of the light rays is a maximum.

The distance (d) from the light source to the first metasurface may satisfy the following condition:

$$d = m \frac{2a_1^2}{\lambda},$$

wherein $\lambda$ denotes the wavelength of the light emitted from the light source, $a_1$ denotes a period at which a same structure is repeated in the first meta optical device, and m denotes a natural number.

The structured light generator may further include a second meta optical device provided between the light source and the first meta optical device, and the second meta optical device may include a second metasurface configured to adjust a beam shape of the light emitted from the light source.

The first meta optical device and the second meta optical device may share a supporting substrate supporting the first metasurface and the second metasurface, and the first metasurface and the second metasurface may be respectively provided on different surfaces of the supporting substrate, the different surfaces facing each other.

The structured light generator may further include a third meta optical device comprising a third meta surface configured to repeatedly form the distribution of the light rays formed by the first meta optical device in a predetermined angular space.

The first meta optical device and the third meta optical device may share a substrate supporting the first metasurface and the third metasurface, and the first metasurface and the third metasurface may be respectively provided on opposite surfaces of the substrate, the opposite surfaces facing each other.

The nanostructures may have cylindrical shapes or polygonal prismatic shapes.

The nanostructures may have asymmetric shapes.

The first meta optical device may further include a substrate supporting the nanostructures.

The nanostructures may include a dielectric material having a refractive index greater than a refractive index of the substrate.

The nanostructures may include a conductive material.

Some nanostructures among the nanostructures may include a dielectric material having a refractive index greater than a refractive index of the substrate, and other nanostructures among the nanostructures may include a conductive material.

According to an aspect of another exemplary embodiment, there is provided a three-dimensional (3D) object recognition apparatus including: a structured light generator including: a light source configured to emit light; and a first meta optical device including a first metasurface including nanostructures having sub-wavelength dimensions that are less than a wavelength of the light emitted from the light source, wherein the first metasurface is configured to form a distribution of light rays from the light emitted from the light source to thereby radiate structured light, and wherein the structured light generator is configured to radiate the structured light in a predetermined pattern toward an object; a sensor configured to receive the structured light reflected from the object; and a processor configured to analyze a shape or motion of the object by comparing pattern changes in the structured light radiated by the structured light generator and the structured light received by the sensor.

According to an aspect of another exemplary embodiment, there is provided an electronic device including the 3D object recognition apparatus.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
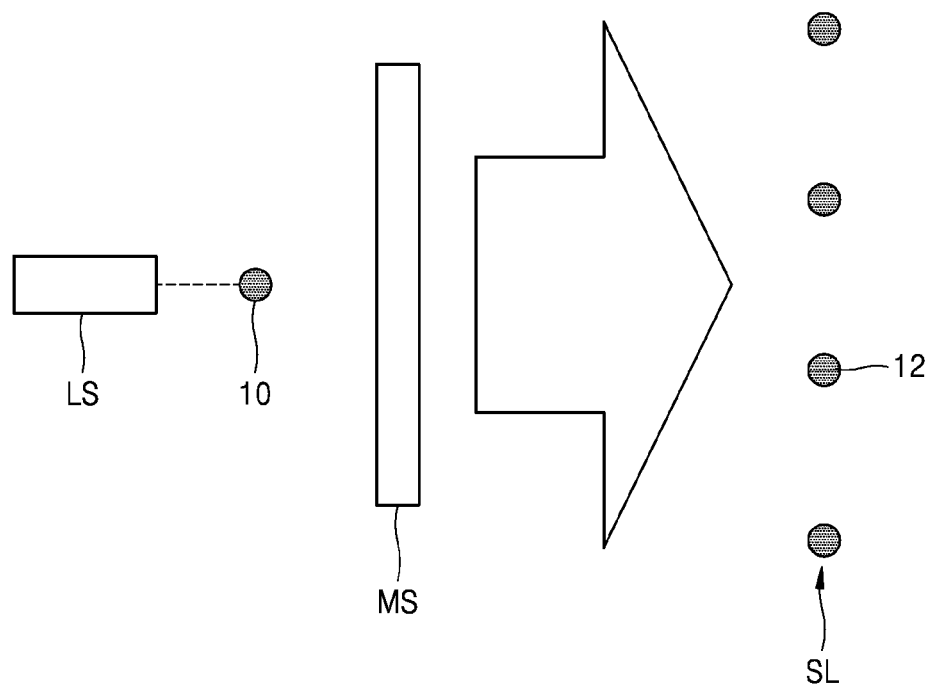
FIG. 1 is a conceptual diagram of structured light formed by a metasurface used in a structured light generator according to an exemplary embodiment.

Reference will now be made in detail to exemplary embodiments, examples of which are illustrated in the accompanying drawings. Like reference numerals in the drawings refer to like elements throughout, and sizes of elements in the drawings may be exaggerated for clarity and convenience of description. The present exemplary embodiments may have different forms and should not be construed as being limited to the descriptions set forth herein. Accordingly, the exemplary embodiments are merely described below, by referring to the figures, to explain aspects.

Hereinafter, it will be understood that when an element or layer is referred to as being "formed on" another element or layer, the element or layer can be in contact with and directly formed on or in non-contact with and indirectly formed on the other element or layer.

As used herein, the singular forms "a," "an," and "the" are intended to include the plural forms as well, unless the context clearly indicates otherwise. It will be further understood that the terms "comprises," "comprising," "includes," and/or "including," when used herein, specify the presence of other elements but do not preclude the presence or addition of other elements unless specifically stated.

In addition, the terms such as "-or" and "-er" refer to a unit for performing at least one function or operation, and the unit may be implemented with hardware or software or a combination of hardware and software.

FIG. 1 is a conceptual diagram of structured light SL formed by a metasurface MS used in a structured light generator according to an exemplary embodiment.

The metasurface MS may form a distribution of light rays from light emitted from a light source LS. The light source LS may be a point light source such as a laser diode. With respect to an incident beam formed by the light source LS, the metasurface MS may form a distribution of light rays that proceed spatially. That is, light that is emitted from the light source LS and forms one beam spot 10 is split into a plurality of light rays by the metasurface MS, and each plurality of light rays forms beam spot images 12 over a predetermined angular space. The beam spot images 12 have various distributions determined by detailed conditions of the metasurface MS, and are referred to as the structured light SL.

Figure 2:
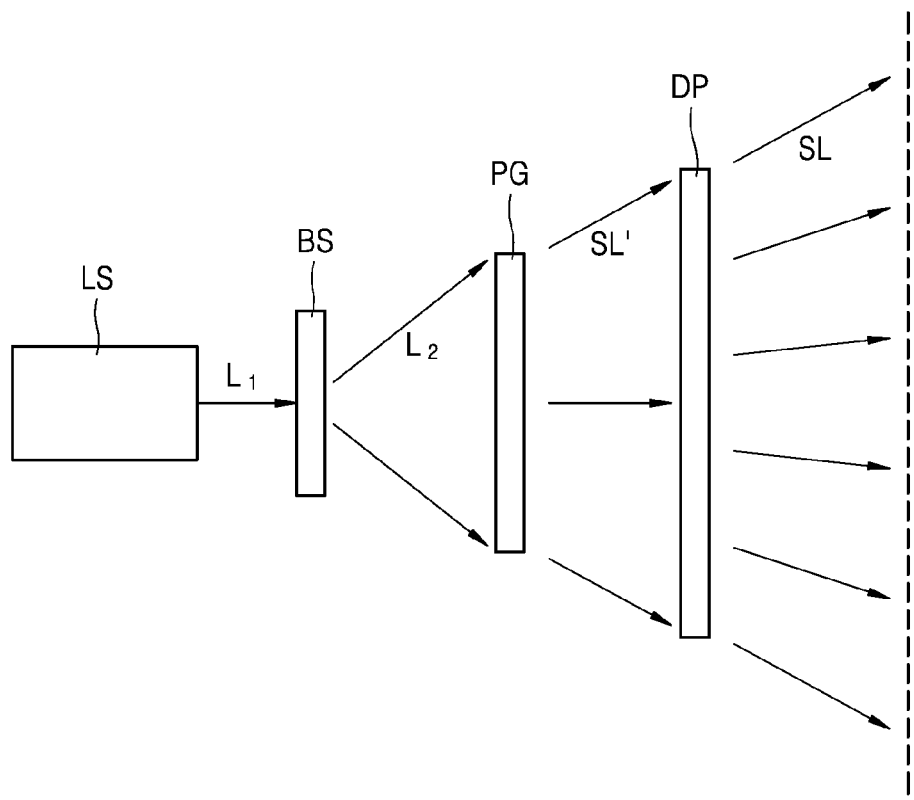
FIG. 2 is a conceptual diagram illustrating examples of an optical function that may be performed by a metasurface used in a structured light generator according to an exemplary embodiment.
Figure 3:
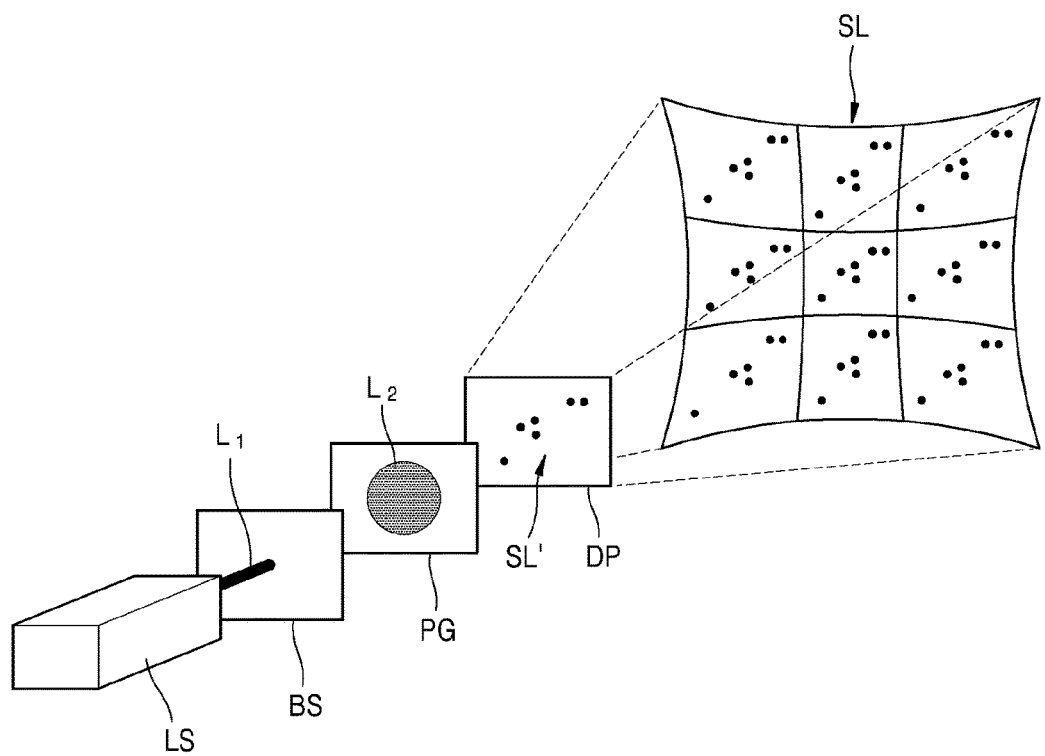
FIG. 3 is a conceptual diagram illustrating an example of a form of a beam incident on each metasurface in FIG. 2.

FIG. 2 is a conceptual diagram illustrating examples of an optical function that may be performed by a metasurface used in a structured light generator according to an exemplary embodiment, and FIG. 3 is a conceptual diagram illustrating an example of the form of a beam incident on each metasurface in FIG. 2.

The metasurface may be realized as a beam shaper BS configured to shape a beam of incident light, a pattern generator PG configured to generate the incident light in a predetermined beam pattern, a duplicator DP configured to duplicate a pattern formed by the pattern generator PG, a combination thereof, and the like.

The beam shaper BS may adjust a divergence angle, a beam section form, a size, or the like of light $L_1$ emitted from the light source LS. A beam $L_2$ shaped by the beam shaper BS is incident on the pattern generator PG and then is emitted as structured light SL' in a predetermined pattern to be incident on the duplicator DP. The duplicator DP may duplicate the structured light SL' formed by the pattern generator PG and thus may form the final structured light SL.

In FIGS. 2 and 3, the function that may be performed by the metasurface is illustrated in order of the beam shaper BS, the pattern generator PG, and the duplicator DP, but exemplary embodiments are not limited thereto. In order to form structured light, one or more of the beam shaper BS, the pattern generator PG, and the duplicator DP may be used, and the arrangement order may also be changed.

Various examples of a structured light generator using a metasurface will now be described.

Figure 4:
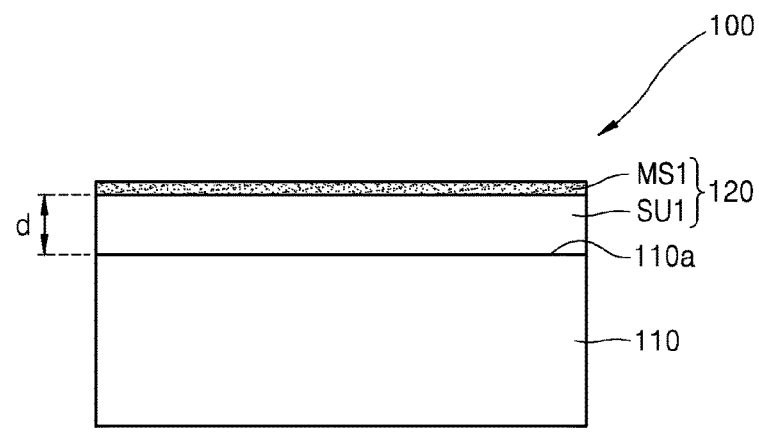
FIG. 4 is a schematic cross-sectional view of a structure of a structured light generator according to an exemplary embodiment.
Figure 5:
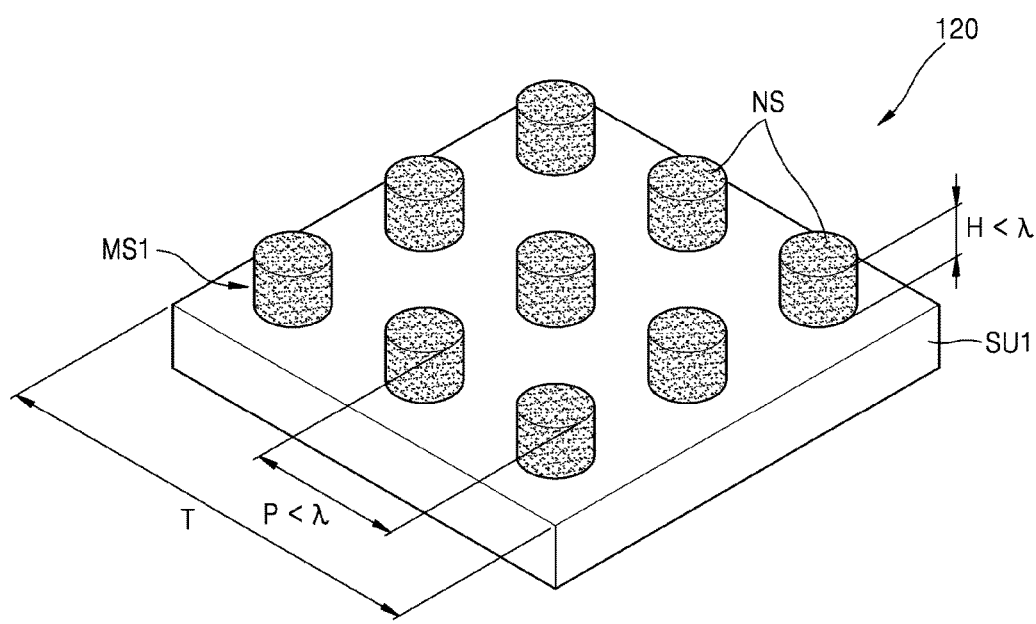
FIG. 5 is a perspective view of an example structure of a metasurface used in the structured light generator of FIG. 4.

FIG. 4 is a schematic cross-sectional view of a structure of a structured light generator 100 according to an exemplary embodiment, and FIG. 5 is a perspective view of an example structure of a first meta optical device 120 used in the structured light generator 100 of FIG. 4.

The structured light generator 120 includes a light source 110 and a first meta optical device 120 forming a distribution of light rays from light from the light source 110.

The light source 110 may be a laser light source and may include an emission layer and a plurality of reflective layers with the emission layer therebetween.

The first meta optical device 120 includes a first metasurface MS1 including a plurality of nanostructures NS having sub-wavelength dimensions less than a wavelength λ of light emitted from the light source 110. A height H of a nanostructure NS is less than the wavelength λ of light emitted from the light source 110. Also, an arrangement distance P between the plurality of nanostructures NS is less than the wavelength A. In FIG. 5, the nanostructure NS is illustrated as having a cylindrical shape, but is not limited thereto. In some exemplary embodiments, the nanostructure NS may have a parallelepiped shape, or have a column shape having various cross-section shapes such as a polygonal shape, a cross shape, a star shape, circular shape, square shape, elliptical shape, rectangular shape, an asymmetric shape, etc. Alternatively, the nanostructure NS may have an asymmetric shape.

Also, the first meta optical device 120 may further include a substrate SU1 supporting the nanostructures NS constituting the first metasurface MS1.

The substrate SU1 may include a dielectric material. For example, a polymer material, such as polycarbonate (PC), polystyrene (PS), or polymethyl methacrylate (PMMA), $SiO_2$, or the like may be used to form the substrate SU1.

The nanostructure NS may include a dielectric material, and may include a material having a refractive index greater than a refractive index of the substrate SU1. For example, one of single crystal silicon, polysilicon, amorphous silicon, $Si_3N_4$, GaP, $TiO_2$, AlSb, AlAs, AlGaAs, AlGaInP, BP, and $ZnGeP_2$ may be used to form the nanostructure NS.

Alternatively, the nanostructures NS may include a conductive material. The conductive material may be a highly conductive metal material where surface plasmon excitation may arise. For example, the nanostructures NS may include at least one selected from copper (Cu), aluminum (Al), nickel (Ni), ferrum (Fe), cobalt (Co), zinc (Zn), titanium (Ti), ruthenium (Ru), rhodium (Rh), palladium (Pd), platinum (Pt), silver (Ag), osmium (Os), iridium (Ir), and gold (Au), and may include an alloy including one of those materials. In some exemplary embodiments, the nanostructures NS may include a two-dimensional material having good conductivity, such as graphene, or conductive oxide.

Alternatively, some of the nanostructures NS may include a dielectric material having a high refractive index, and other nanostructures NS may include a conductive material. That is, some of the nanostructures NS may include a dielectric material having a refractive index greater than a refractive index of the substrate SU1, and other nanostructures NS may include a conductive material.

The nanostructures NS may each have transmission intensity and transmission phases according to respective materials and shapes. Shapes of the nanostructures NS may be adjusted to adjust a phase or intensity distribution of light passing through the first metasurface MS1. In FIG. 5, all of the nanostructures NS illustrated have the same shape, size, and height. However, this illustration is just an example, and the exemplary embodiments are not limited thereto. For example, a horizontal or vertical size or a composition material of individual nanostructures NS may be adjusted according to a location of the nanostructures NS to obtain a desired transmission intensity distribution or transmission phase distribution. In order to obtain the desired transmission intensity distribution or transmission phase distribution, a shape distribution of the nanostructures NS at each location may be determined with respect to a predetermined group including the nanostructures NS. Also, a group of the nanostructures NS formed as such may be repeatedly arranged with a predetermined period T. For example, FIG. 5 illustrates one group of the nanostructures NS, and the first metasurface MS1 may include the illustrated group of the nanostructures NS that is repeatedly arranged.

The first metasurface MS1 may have shapes and arrangement of the nanostructures NS determined to function as a pattern generator for light emitted from the light source 110.

The first meta optical device 120 may be configured to have a monolithic structure directly on a light exit surface 110a of the light source 110. When the first metasurface MS1 includes a group of the nanostructures NS repeatedly arranged with the predetermined period T, a distance d between the first metasurface MS1 and the light exit surface 110a may be determined so that a contrast ratio of structured light generated by the structured light generator 100, that is, contrast, may be maximum, and a thickness of the substrate SU1 may be determined according to the determined distance d. The distance d may be calculated using the following equation (1):

$$d = m \frac{2a_1^2}{\lambda} \qquad \text{Equation (1)}$$

In Equation (1), A denotes a wavelength of light emitted from the light source 110, $a_1$ denotes a period at which the same structure is repeated in the first meta optical device 120, and m denotes a natural number. That is, $a_1$ is the period T with which the group of the nanostructures NS having the predetermined shape distribution illustrated in FIG. 5 is repeatedly arranged.

The distance d denotes a condition where the contrast is maximum, and a distance between the first metasurface MS1 and the light exit surface 110a is not limited thereto. For example, the distance d may be determined by taking into account high contrast, complexity of a structured light pattern, and the like.

A volume of the structured light generator 100 may be greatly decreased due to the monolithically formed first meta optical device 120 being directly provided on the light exit surface 110a of the light source 110. The first metasurface MS1 may be very thin having a thickness of several microns or less, and accordingly, a thickness of the first meta optical device 120 may be greatly decreased to tens of microns or less. As the whole volume of the structured light generator 100 greatly decreases, limitations on manufacturing, for example, limitations on use in other electronic devices, may decrease, thereby enhancing price competitiveness and broadening application ranges.

The first metasurface MS1 used in the structured light generator 100 according to the present exemplary embodiment may have shapes and an arrangement of the nanostructures NS determined to serve as a pattern generator. For example, shapes and an arrangement of the nanostructures NS may be determined so that two phase modulation values with respect to incident light may be repeatedly shown. For example, the first metasurface MS1 may have two phase modulation values of 0 and π.

Figure 6:
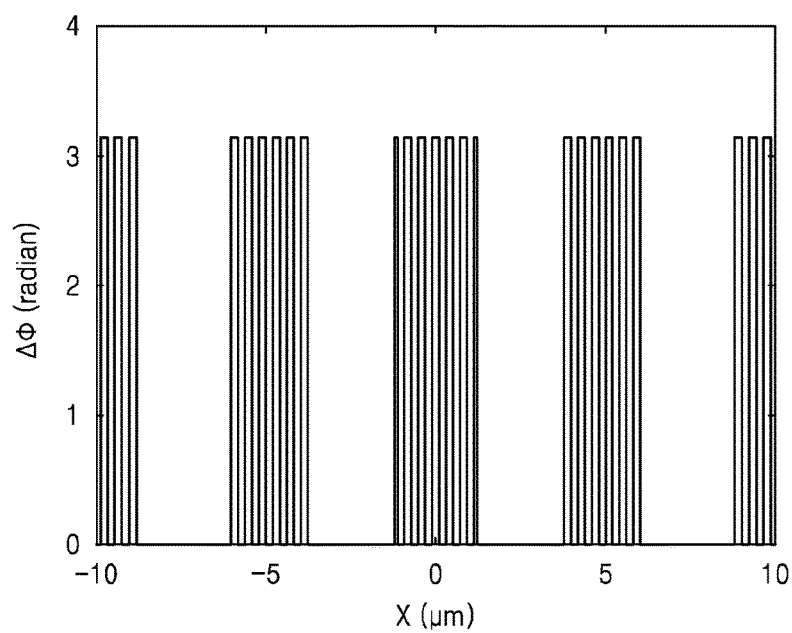
FIG. 6 is a graph showing an example of a phase change distribution caused by the metasurface of the structured light generator of FIG. 4.

FIG. 6 is a graph showing an example of a transmission phase change distribution caused by the first metasurface MS1 of the structured light generator 100 of FIG. 4.

The letter X marked on a horizontal axis of the graph denotes a one-dimensional direction in which the nanostructures NS are arranged. Referring to the graph, a pulse train in which the transmission phases of 0 and π repeatedly occur during a period of 0.5 um is shown, and a duty cycle of the pulse train is 0.5. The form of transmission phase distribution implemented is an example, and shapes, arrangement, and materials of the nanostructures NS may be variously modified to form a desired structured light pattern.

Figure 7:
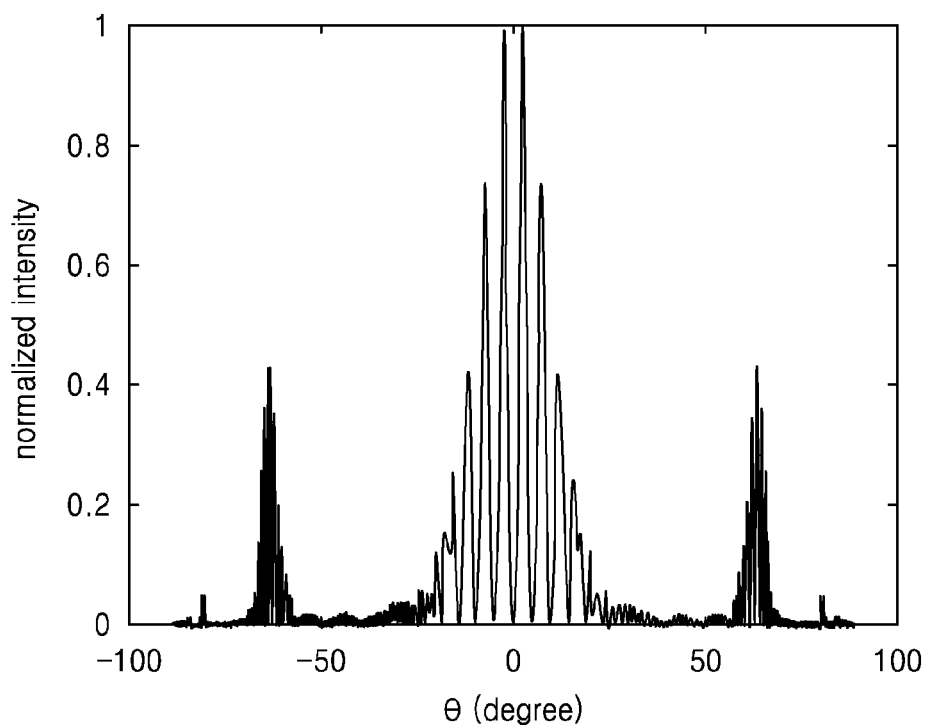
FIG. 7 is a graph showing distribution of rays of light, that is, a structured light pattern, formed by a structured light generator having the phase change distribution of FIG. 6 as an intensity distribution in angular space.

FIG. 7 is a graph showing a distribution of light rays, that is, a structured light pattern, formed by a structured light generator having the transmission phase distribution of FIG. 6 as an intensity distribution in angular space.

Referring to FIG. 7, the intensity distribution is not uniform at each angular location. However, design factors of the first metasurface MS1 may be adjusted to make the intensity distribution at each angular location uniform.

Figure 8:
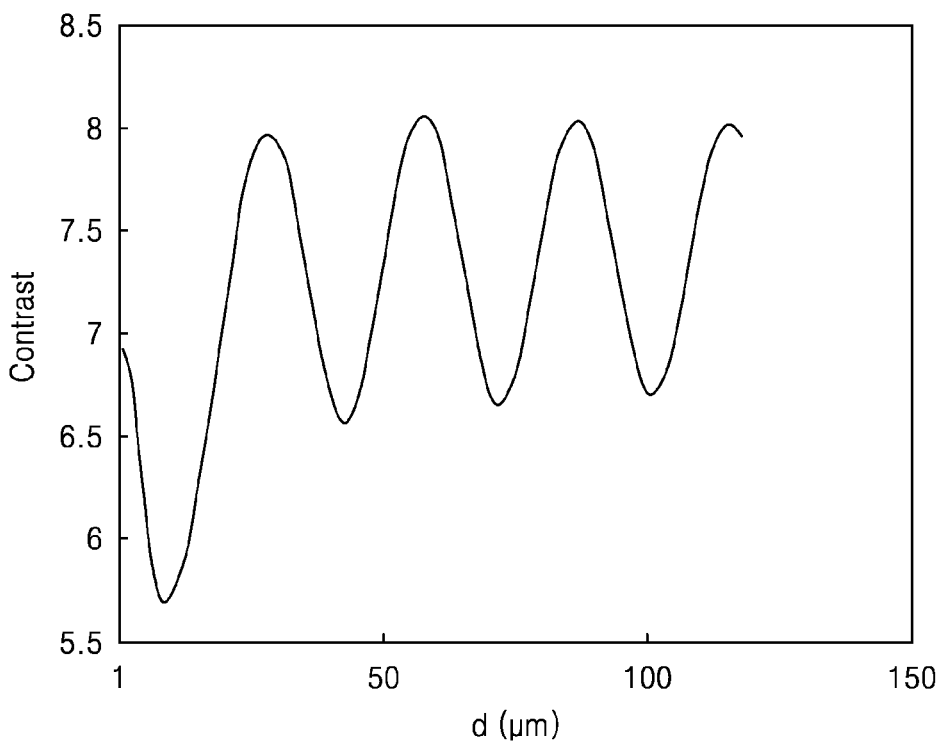
FIG. 8 is a graph showing contrast of the structured light pattern of FIG. 7 according to a distance between a light exit surface and a metasurface in the structured light generator of FIG. 4.

FIG. 8 is a graph showing a contrast of the structured light pattern of FIG. 7 according to a distance between the light exit surface 110a and the first metasurface MS1 in the structured light generator 100 of FIG. 4.

Referring to FIG. 8, a change in contrast from a minimum value to a maximum value is repeatedly shown. It may be seen that the maximum value of the contrast repeatedly occurs when the distance d is an integer multiple of a predetermined value. The distance between the light exit surface 110a and the first metasurface MS1 may be determined by taking the graph of FIG. 8 into account.

Figure 9:
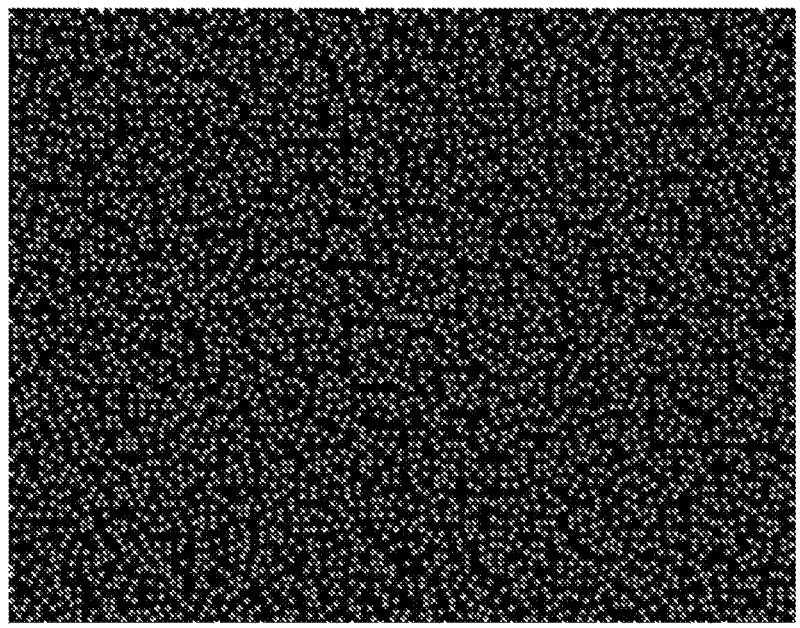
FIG. 9 shows an example of distribution of rays of light, that is, a structured light pattern, formed by the structured light generator of FIG. 4.

FIG. 9 shows an example of a distribution of light rays, that is, a structured light pattern, formed by the structured light generator 100 of FIG. 4.

Bright spots are rays of light formed over angular space by the first metasurface MS1 from incident light emitted from a light source. Such structured light may be used to analyze a motion of an object, a three-dimensional shape, or the like by comparing a change of pattern of the structured light that occurs when being irradiated on and reflected by the object. In this respect, as contrast indicating a difference between a bright spot and a dark portion increases, such an analysis may become easier. Also, a uniform intensity distribution over angular space may make the analysis easier.

Figure 10:
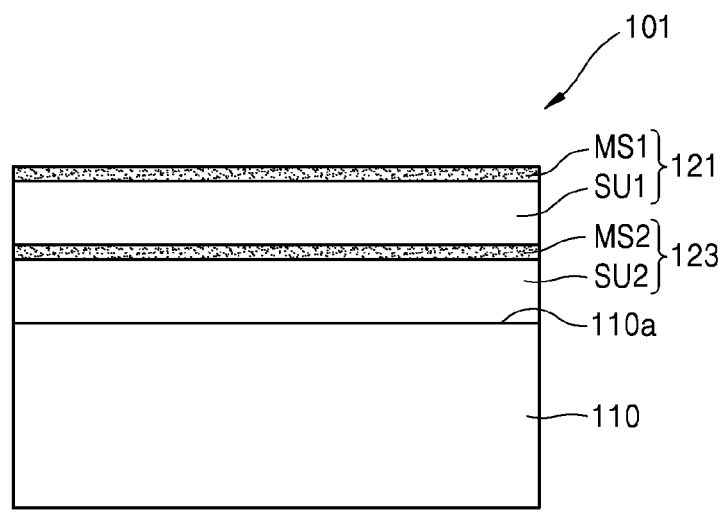
FIG. 10 is a schematic cross-sectional view of a structure of a structured light generator according to another exemplary embodiment.

FIG. 10 is a schematic cross-sectional view of a structure of a structured light generator 101 according to another exemplary embodiment.

The structured light generator 101 includes the light source 110, a second meta optical device 123 on the light exit surface 110a of the light source 110, and a first meta optical device 121 on the second meta optical device 123.

The first meta optical device 121 includes the substrate SU1 and the first metasurface MS1, and the second meta optical device 123 includes a substrate SU2 and a second metasurface MS2.

In the present exemplary embodiment, the second metasurface MS2 is designed to serve as a beam shaper shaping light from the light source 110. That is, the second metasurface MS2 adjusts a divergence angle of light emitted from the light source 110 to be incident on the first metasurface MS1. The first metasurface MS1 serves as a pattern generator forming distribution of rays of light from incident light having a divergence angle and an incident beam form adjusted by the second metasurface MS2.

The first metasurface MS1 and the second metasurface MS2 each include a plurality of nanostructures having sub wavelength dimensions, wherein shapes and arrangement of the plurality of nanostructures are designed according to each of the above functions.

Figure 11:
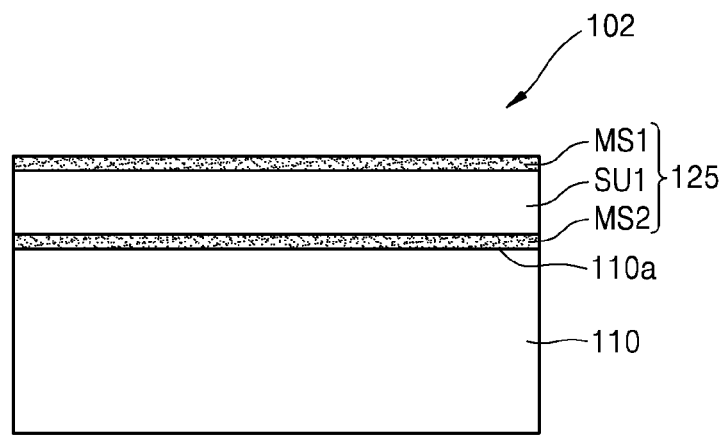
FIG. 11 is a schematic cross-sectional view of a structure of a structured light generator according to another exemplary embodiment.

FIG. 11 is a schematic cross-sectional view of a structure of a structured light generator 102 according to another exemplary embodiment.

The structured light generator 102 includes the light source 110, and a meta optical device 125 on the light exit surface 110a of the light source 110. The structured light generator 102 according to the present exemplary embodiment is modified from the structured light generator 101 of FIG. 10 in that, according to the structured light generator 102, the substrate SU1 is shared by and supports the first metasurface MS1 and the second metasurface MS2. That is, the meta optical device 125 has the first metasurface MS1 and the second metasurface MS2 respectively on both surfaces of the substrate SU1. The second metasurface MS2 serves as a beam shaper and directly contacts the light exit surface 110a. The first metasurface MS1 forms distribution of rays of light from incident light having a divergence angle and an incident beam form adjusted by the second metasurface MS2.

Figure 12:
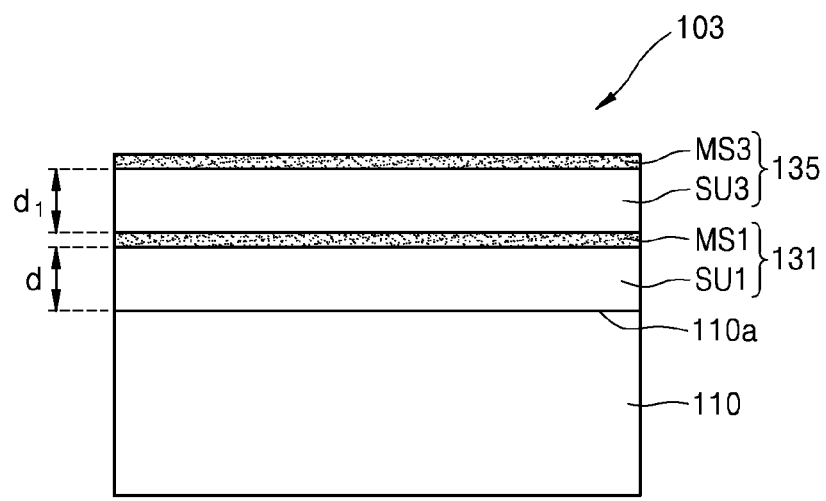
FIG. 12 is a schematic cross-sectional view of a structure of a structured light generator according to another exemplary embodiment.

FIG. 12 is a schematic cross-sectional view of a structure of a structured light generator 103 according to another exemplary embodiment.

The structured light generator 103 includes the light source 110, a first meta optical device 131 and a third meta optical device 135, on the light exit surface 110a of the light source 110.

The first meta optical device 131 includes the substrate SU1 and the first metasurface MS1, and the third meta optical device 135 includes a substrate SU3 and a third metasurface MS3.

In the present exemplary embodiment, the first metasurface MS1 serves as a pattern generator forming distribution of rays of light from light emitted from the light source 110, and the third metasurface MS3 may be designed to serve as a duplicator duplicating the distribution of rays of light formed by the first metasurface MS1.

The first metasurface MS1 and the third metasurface MS3 each include a plurality of nanostructures having sub wavelength dimensions, wherein shapes and an arrangement of the plurality of nanostructures are designed according to each of the above functions.

Figure 13:
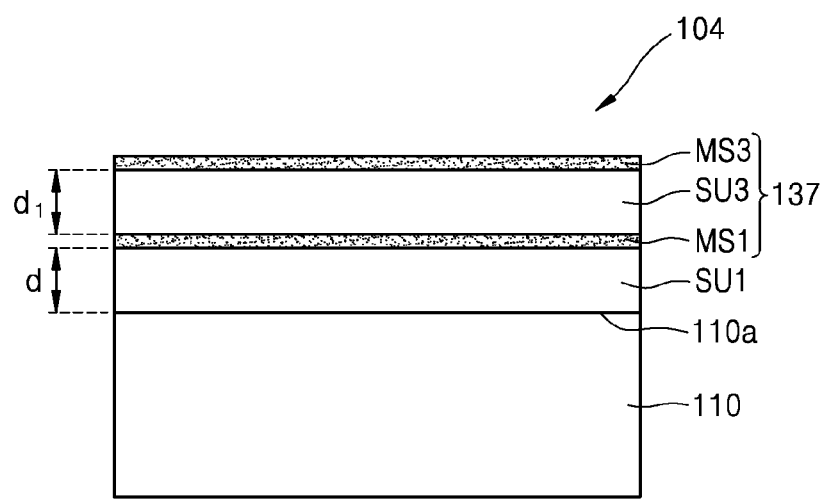
FIG. 13 is a schematic cross-sectional view of a structure of a structured light generator according to another exemplary embodiment.

FIG. 13 is a schematic cross-sectional view of a structure of a structured light generator 104 according to another exemplary embodiment.

The structured light generator 104 includes the light source 110, and a meta optical device 137 on the light exit surface 110a of the light source 110. The structured light generator 104 according to the present exemplary embodiment is modified from the structured light generator 103 of FIG. 12 in that, according to the structured light generator 104, the substrate SU3 is shared by and supports the first metasurface MS1 and the third metasurface MS3. That is, the meta optical device 137 has the first metasurface MS1 and the third metasurface MS3 respectively on both surfaces of the substrate SU3. The first metasurface MS1 and the third metasurface MS3 are designed to serve as a pattern generator and a duplicator, respectively.

The structured light generator 104 according to the present exemplary embodiment is different from the structured light generator 103 of FIG. 12 in that the first metasurface MS1 and the third metasurface MS3 are on both surfaces of one substrate SU3. Also, the substrate SU1 having a thickness which may satisfy a condition of a distance between the light exit surface 110a and the first metasurface MS1 is provided between the light source 110 and the meta optical device 137.

Examples of a structured light generator including two metasurfaces have been described thus far. Although examples in which the two metasurfaces are designed to serve as a beam shaper and a pattern generator, respectively, or serve as a pattern generator and a duplicator, respectively, have been described, examples of the two metasurfaces are not limited thereto.

In addition, according to certain exemplary embodiments, more than two metasurfaces may be used. For example, a structured light generator including three metasurfaces serving as a beam shaper, a pattern generator, and a duplicator, respectively, may be implemented.

Figure 14:
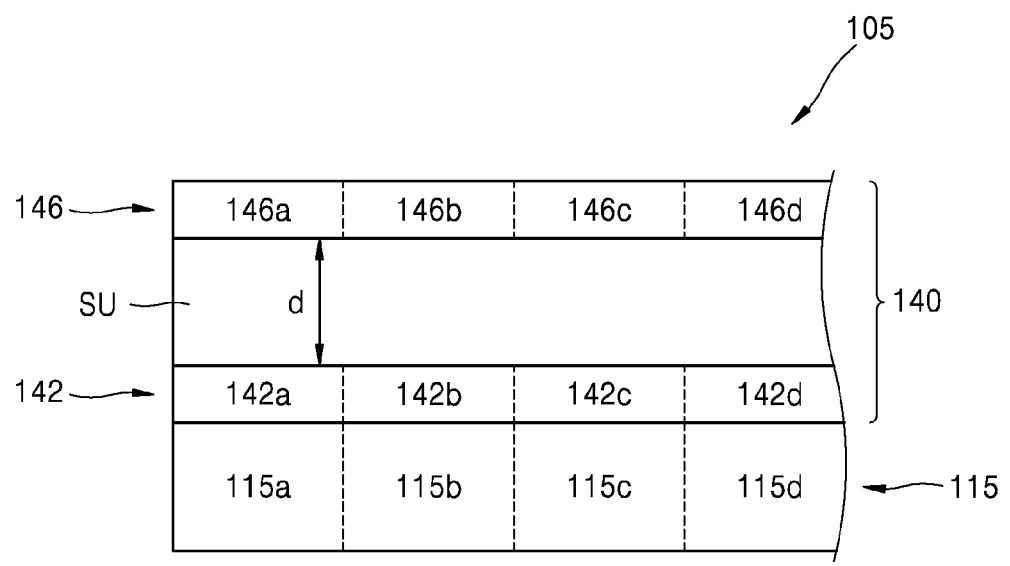
FIG. 14 is a schematic cross-sectional view of a structure of a structured light generator according to another exemplary embodiment.
Figure 15:
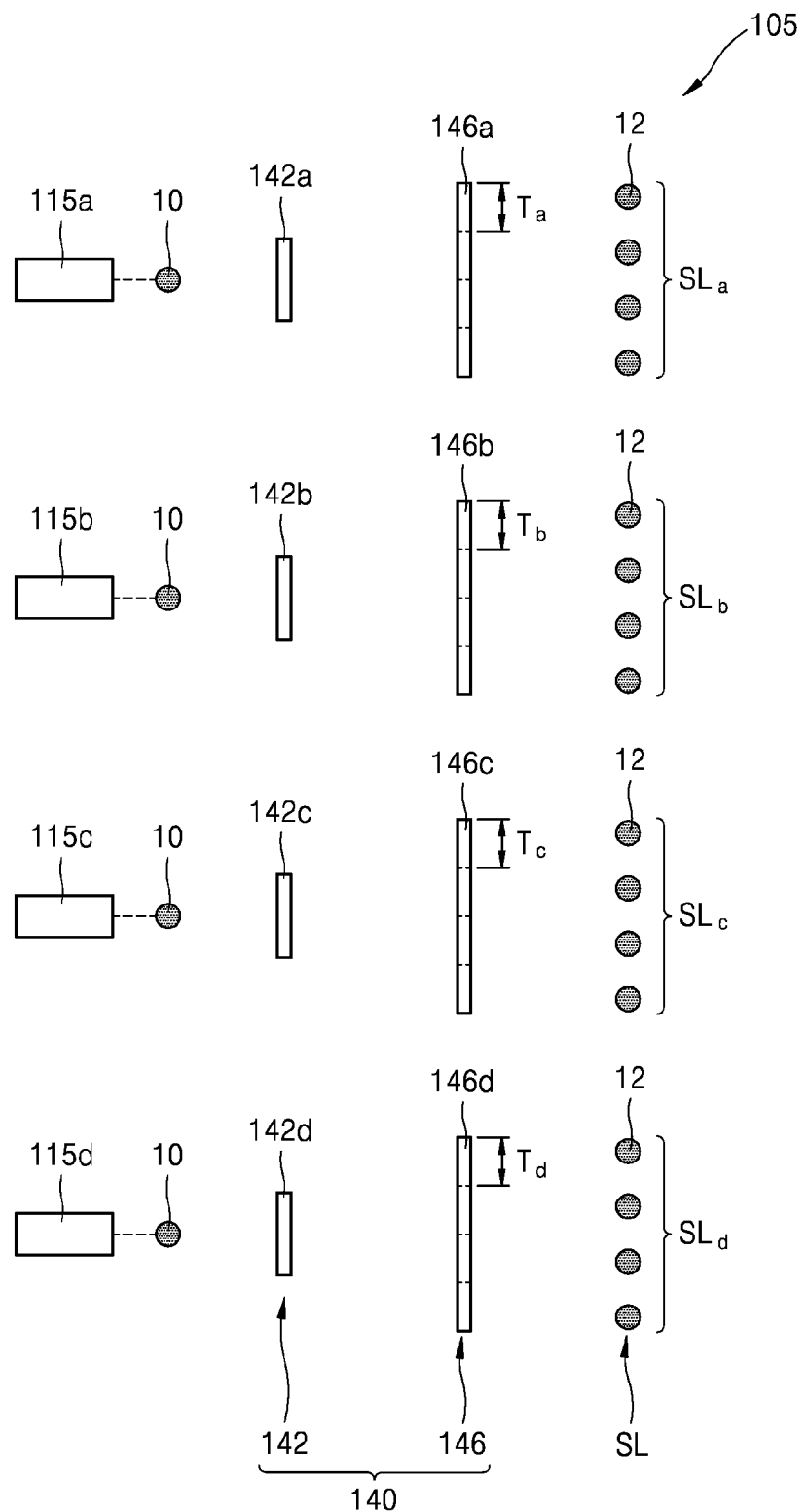
FIG. 15 conceptually shows that incident beams from respective light sources are self-imaged in different forms by the structured light generator of FIG. 14 to form complex structured light.

FIG. 14 is a schematic cross-sectional view of a structure of a structured light generator 105 according to another exemplary embodiment, and FIG. 15 conceptually shows incident beams of a plurality of light sources being self-imaged by the structured light generator 105 of FIG. 14 to form structured light.

The structured light generator 105 includes a light source array 115, and a meta optical device 140 on the light source array 115.

The light source array 115 includes a plurality of light sources 115a to 115d. For example, the light source array 115 may be a vertical-cavity surface-emitting laser (VCSEL) array.

The meta optical device 140 includes a first metasurface array 146 and a second metasurface array 142. The first metasurface array 146 and the second metasurface array 142 may be respectively located on both surfaces of a substrate SU. A thickness d of the substrate SU may be determined to satisfy requirements for a distance between the first metasurface array 146 and the second metasurface array 142.

The meta optical device 140 may be integrated on the light source array 115.

The second metasurface array 142 includes a plurality of second metasurfaces 142a, 142b, 142c, and 142d respectively facing the plurality of light sources 115a, 115b, 115c, and 115d. The plurality of second metasurfaces 142a to 142d may serve as beam shapers shaping light emitted from the light sources 115a to 115d, respectively.

The first metasurface array 146 includes a plurality of first metasurfaces 146a, 146b, 146c, and 146d forming distribution of rays of light from respective beams shaped by the second metasurfaces 142a to 142d.

Although all of the plurality of first metasurfaces 146a to 146d serve as pattern generators, patterns of structured lights $SL_a$ to $SL_d$ respectively generated by the first metasurfaces 146a to 146d may be different from each other. That is, the first metasurfaces 146a to 146d form image beams 12 to which an incident beam 10 emitted from each light source 115a to 115d is self-imaged, but form respectively unique patterns so that how the image beams 12 are distributed over space may be different from each other. To achieve this feature, the first metasurfaces 146a to 146d may each include a plurality of nanostructures having sub wavelength dimensions, but respective periods $T_a$, $T_b$, $T_c$, and $T_d$ of repeatedly arranging the same structure may be different from each other.

The structured light generator 105 is for generating complex and sophisticated structured light. The first metasurfaces 146a to 146d generating structured light having different patterns from each other may be disposed to correspond to the light sources 115a to 115d, respectively, so that various patterns of the structured light $SL_a$, $SL_b$, $SL_c$, and $SL_d$ may be generated, and final structured light SL which is more complex and sophisticated may be formed due to overlapping of the generated patterns of the structured light $SL_a$ to $SL_d$.

Although an example of the structured light generator 105 in which the second metasurface array 142 serving as a beam shaper and the first metasurface array 146 serving as a pattern generator are provided on the light source array 115 is shown, the structured light generator 105 is not limited thereto. The structured light generator 105 may be modified to include a metasurface array serving as a pattern generator and a metasurface array serving as a duplicator.

Figure 16:
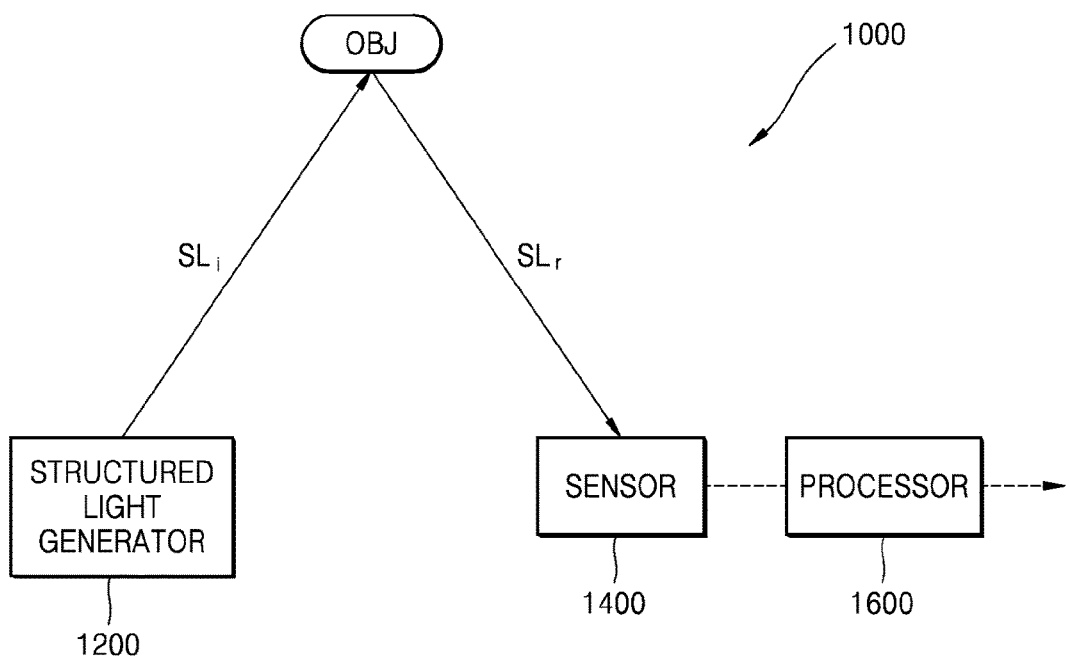
FIG. 16 is a schematic block diagram of a structure of a three-dimensional (3D) object recognition apparatus according to an exemplary embodiment.

FIG. 16 is a schematic block diagram of a structure of a three-dimensional (3D) object recognition apparatus 1000 according to an exemplary embodiment.

The 3D object recognition apparatus 1000 includes a structured light generator 1200 which radiates structured light $SL_i$ of a predetermined pattern toward an object OBJ, a sensor 1400 which receives the structured light $SL_r$ reflected from the object OBJ, and a processor 1600 which analyzes depth information, a shape, or a motion of the object OBJ having a 3D shape by comparing pattern changes in the structured light $SL_i$ radiated by the structured light generator 1200 and the structured light $SL_r$ received by the sensor 1400.

The structured light generator 1200 may include a light source and at least one metasurface and may take the form of one of the structured light generators 100 to 105 according to the previous exemplary embodiments or a combination thereof.

The sensor 1400 senses the structured light $SL_r$ reflected by the object OBJ.

The processor 1600 may compare the structured light $SL_i$ radiated on the object OBJ and the structured light $SL_r$ reflected from the object OBJ with each other to analyze a 3D shape, a location, a motion, etc. of the object OBJ. The structured light $SL_i$ generated by the structured light generator 1200 is a pattern in which bright and dark spots are mathematically coded to uniquely designate respective angle direction location coordinates. When such a pattern is hit upon a 3D object and is reflected, a pattern of the reflected structured light $SL_r$ takes a changed form of the pattern of the radiated structured light $SL_i$. 3D information of the object OBJ may be extracted by comparing those patterns with each other and tracking a pattern for each coordinate.

The 3D object recognition apparatus 1000 may further include a controller which controls an operation of driving the light source in the structured light generator 1200, an operation of the sensor 1600, or the overall operations of the entire 3D object recognition apparatus 1000. In addition, the 3D object recognition apparatus 1000 may further include a memory, etc., which stores an operation program for 3D information extraction to be performed in the processor 1600.

An operation result of the processor 1600, that is, information regarding a shape and a location of the object OBJ, may be transmitted to another unit. For example, the information may be transmitted to a controller of an electronic device in which the 3D object recognition apparatus 1000 is used.

The 3D object recognition apparatus 1000 may be used as a sensor which precisely obtains 3D information regarding an object (e.g., an object in front of the 3D object recognition apparatus 1000) and thus may be used in various electronic devices. For example, such an electronic device may be an autonomous driving device such as a driverless car, an autonomous vehicle, a robot, or a drone, an augmented reality device, a mobile communication device, or an Internet of Things (IoT) device.

The structured light generator according to one or more of the above exemplary embodiments may form a distribution of rays of light (structured light) from light emitted by a light source by using a metasurface including nanostructures of a sub wavelength.

The structured light generator according to one or more of the above exemplary embodiments uses a structure in which a meta optical device is integrated on a light source, and thus, is easy to miniaturize.

The structured light generator according to one or more of the above exemplary embodiments may use one or more metasurfaces and adjust a distance between a light source and a metasurface, and transmission phase distribution and transmission intensity distribution of the metasurface, to generate structured light having a high contrast ratio.

The structured light generator according to one or more of the above exemplary embodiments may be used in a 3D object recognition apparatus configured to sense a precise motion and 3D shape of an object.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A structured light generator comprising:
a light source configured to emit light; and
a first meta optical device comprising a first metasurface comprising nanostructures having sub-wavelength dimensions that are less than a wavelength of the light emitted from the light source,
wherein the first metasurface is configured to form a distribution of light rays from the light emitted from the light source to thereby radiate structured light; and,
a second meta optical device provided between the light source and the first meta optical device, the second meta optical device comprising a second metasurface configured to receive the light emitted from the light source, adjust a beam shape of the light emitted from the light source, and propagate the light having the adjusted beam shape to the first meta optical device.

2. The structured light generator of claim 1, wherein the nanostructures of the first meta optical device have forms that are configured to realize a predetermined transmission intensity distribution and transmission phase distribution with respect to the emitted light incident thereon.

3. The structured light generator of claim 1, wherein:
the light source comprises a light exit surface through which the emitted light exits; and
the first meta optical device has a monolithic structure and is provided directly on the light exit surface of the light source.

4. The structured light generator of claim 1, wherein the nanostructures of the first meta optical device have shapes and an arrangement that are determined such that a transmission intensity distribution and transmission phase distribution with respect to the emitted light incident thereon are repeated.

5. The structured light generator of claim 4, wherein the nanostructures of the first meta optical device have the shapes and distribution such that two transmission phase modulation values are obtained.

6. The structured light generator of claim 5, wherein the two transmission phase modulation values are 0 and $\pi$.

7. The structured light generator of claim 4, wherein a distance from the light source to the first metasurface is determined such that a contrast of a structured light pattern formed by the distribution of the light rays is a maximum.

8. The structured light generator of claim 7, wherein the distance (d) from the light source to the first metasurface satisfies the following condition:

$$d = m\frac{2a_1^2}{\lambda},$$

wherein $\lambda$ denotes the wavelength of the light emitted from the light source, $a_1$ denotes a period at which a same structure is repeated in the first meta optical device, and m denotes a natural number.

9. The structured light generator of claim 1, wherein the first meta optical device and the second meta optical device share a supporting substrate supporting the first metasurface and the second metasurface, and
the first metasurface and the second metasurface are respectively provided on different surfaces of the supporting substrate, the different surfaces facing each other.

10. The structured light generator of claim 1, further comprising a third meta optical device comprising a third meta surface configured to repeatedly form the distribution of the light rays formed by the first meta optical device in a predetermined angular space.

11. The structured light generator of claim 1, wherein the nanostructures have cylindrical shapes.

12. The structured light generator of claim 1, wherein the first meta optical device is directly disposed on and in contact with the second meta optical device.

13. The structured light generator of claim 12, wherein the nanostructures comprise a dielectric material having a refractive index greater than a refractive index of the substrate.

14. The structured light generator of claim 1, wherein a distance from the light source to the first metasurface is set to be inversely proportional to the wavelength of the light emitted from the light source, and directly proportional to a square of a period at which a same structure is repeated in the first meta optical device.

15. The structured light generator of claim 12, wherein some nanostructures among the nanostructures comprise a dielectric material having a refractive index greater than a refractive index of the substrate, and other nanostructures among the nanostructures comprise a conductive material.

16. A structured light generator comprising:
a light source configured to emit light;
a first meta optical device comprising a first metasurface comprising nanostructures having sub-wavelength dimensions that are less than a wavelength of the light emitted from the light source,
wherein the first metasurface is configured to form a distribution of light rays from the light emitted from the light source to thereby radiate structured light in a predetermined beam pattern; and
a third meta optical device comprising a third meta surface configured to duplicate the predetermined beam pattern of the structured light that is radiated from the first meta optical device in a predetermined angular space,
wherein the first meta optical device is disposed between the light source and the third meta optical device, so that the light rays is directly propagated from the first metasurface to the third meta surface.

17. The structured light generator of claim 16, wherein the first meta optical device and the third meta optical device share a substrate supporting the first metasurface and the third metasurface, and
the first metasurface and the third metasurface are respectively provided on opposite surfaces of the substrate, the opposite surfaces facing each other.

18. A three-dimensional (3D) object recognition apparatus comprising:
a structured light generator of claim 1;
a sensor configured to receive the structured light reflected from the object; and
a processor configured to analyze a shape or motion of the object by comparing pattern changes in the structured light radiated by the structured light generator and the structured light received by the sensor.

19. A three-dimensional (3D) object recognition apparatus comprising:
a structured light generator of claim 16;
a sensor configured to receive the structured light reflected from the object; and
a processor configured to analyze a shape or motion of the object by comparing pattern changes in the structured light radiated by the structured light generator and the structured light received by the sensor.

20. An electronic device comprising the 3D object recognition apparatus of claim 18.

* * * * *